United States Patent [19]
Ahluwalia

[11] Patent Number: 5,965,257
[45] Date of Patent: Oct. 12, 1999

[54] COATED STRUCTURAL ARTICLES

[75] Inventor: Younger Ahluwalia, Desoto, Tex.

[73] Assignee: ELK Corporation of Dallas, Dallas, Tex.

[21] Appl. No.: 09/134,200

[22] Filed: Aug. 14, 1998

Related U.S. Application Data

[63] Continuation-in-part of application No. 08/885,760, Jun. 27, 1997, abandoned.

[51] Int. Cl.$^6$ ........................................ B32B 19/00
[52] U.S. Cl. .................. 428/357; 428/36.4; 428/105; 428/190; 428/304.4; 428/306.6; 428/317.7; 428/319.1; 428/320; 428/323; 428/362; 428/921; 442/29; 442/44; 442/68; 442/164; 427/389.8; 427/407.3; 52/309.13; 52/309.15
[58] Field of Search .................... 428/304.4, 323, 428/319.1, 357, 362, 524, 320, 190, 317.7, 921, 306.6, 341, 36.4, 212, 105; 442/417, 164, 29, 374, 44, 68; 427/407.3, 389.8; 52/309.13, 309.15

[56] References Cited

U.S. PATENT DOCUMENTS

| | | | |
|---|---|---|---|
| 3,616,173 | 10/1971 | Green et al. | 428/331 |
| 3,841,885 | 10/1974 | Jakel | 106/663 |
| 3,954,555 | 5/1976 | Kole et al. | 162/136 |
| 4,044,188 | 8/1977 | Segal | 428/297.4 |
| 4,073,997 | 2/1978 | Richards et al. | 442/374 |
| 4,186,236 | 1/1980 | Heitmann | 442/374 |
| 4,212,912 | 7/1980 | Wartusch et al. | 428/209 |
| 4,212,913 | 7/1980 | Auten | 442/44 |
| 4,229,329 | 10/1980 | Bennett | 524/44 |
| 4,265,962 | 5/1981 | May | 442/82 |
| 4,291,086 | 9/1981 | Auten | 442/29 |
| 4,306,911 | 12/1981 | Gorden et al. | 106/644 |
| 4,313,968 | 2/1982 | Sickles et al. | 427/483 |
| 4,331,726 | 5/1982 | Cleary | 428/143 |
| 4,388,366 | 6/1983 | Rosato et al. | 442/374 |
| 4,405,680 | 9/1983 | Hansen | 442/180 |
| 4,460,737 | 7/1984 | Evans et al. | 524/584 |
| 4,472,243 | 9/1984 | Bondoc et al. | 162/135 |
| 4,473,610 | 9/1984 | Davis | 428/143 |
| 4,478,610 | 10/1984 | Parekh et al. | 51/298 |
| 4,506,060 | 3/1985 | White, Sr. et al. | 525/163 |
| 4,555,543 | 11/1985 | Effenberger, et al. | 524/520 |
| 4,560,612 | 12/1985 | Yau | 442/176 |
| 4,571,356 | 2/1986 | White, Sr. et al. | 428/143 |
| 4,609,709 | 9/1986 | Yau | 525/164 |
| 4,610,918 | 9/1986 | Effenberger et al. | 442/68 |
| 4,612,238 | 9/1986 | DellaVecchia et al. | 428/180 |
| 4,647,496 | 3/1987 | Lehnert et al. | 442/386 |
| 4,654,235 | 3/1987 | Effenberger et al. | 427/407.3 |
| 4,664,707 | 5/1987 | Wilson et al. | 106/18.11 |
| 4,683,165 | 7/1987 | Lindemann et al. | 442/173 |
| 4,745,032 | 5/1988 | Morrison | 428/215 |
| 4,746,560 | 5/1988 | Goeden | 428/151 |
| 4,764,420 | 8/1988 | Gluck et al. | 428/317.7 |
| 4,810,569 | 3/1989 | Lehnert et al. | 442/386 |
| 4,835,004 | 5/1989 | Kawanishi | 427/458 |
| 4,879,173 | 11/1989 | Randall | 442/86 |
| 4,917,764 | 4/1990 | Lalwani et al. | 162/156 |
| 4,944,818 | 7/1990 | Dybsky et al. | 156/71 |
| 5,001,005 | 3/1991 | Blanpied | 442/373 |
| 5,015,711 | 5/1991 | Simonet et al. | 526/301 |
| 5,030,507 | 7/1991 | Mudge et al. | 442/147 |
| 5,110,839 | 5/1992 | Chao | 521/83 |
| 5,112,678 | 5/1992 | Gay et al. | 442/173 |
| 5,148,645 | 9/1992 | Lehnert et al. | 52/443 |
| 5,192,366 | 3/1993 | Nishioka et al. | 106/724 |
| 5,220,762 | 6/1993 | Lehnert et al. | 52/408 |
| 5,232,530 | 8/1993 | Malmquist et al. | 156/78 |
| 5,318,844 | 6/1994 | Brandon | 428/357 |
| 5,334,648 | 8/1994 | Drews et al. | 524/512 |
| 5,342,680 | 8/1994 | Randall | 442/71 |
| 5,371,989 | 12/1994 | Lehnert et al. | 52/309.17 |
| 5,391,417 | 2/1995 | Pike | 428/143 |
| 5,393,794 | 2/1995 | Sperber | 521/78 |
| 5,397,631 | 3/1995 | Green et al. | 428/219 |
| 5,401,588 | 3/1995 | Garvey et al. | 428/703 |
| 5,445,878 | 8/1995 | Mirous | 442/327 |
| 5,518,586 | 5/1996 | Mirous | 162/156 |
| 5,565,239 | 10/1996 | Pike | 427/186 |
| 5,573,586 | 11/1996 | Yap et al. | 106/688 |
| 5,580,378 | 12/1996 | Shulman | 106/677 |
| 5,601,680 | 2/1997 | Kuszaj et al. | 156/242 |
| 5,601,888 | 2/1997 | Fowler | 428/34 |
| 5,665,442 | 9/1997 | Andersen et al. | 428/36.4 |
| 5,698,304 | 12/1997 | Brandon et al. | 428/215 |
| 5,718,785 | 2/1998 | Randall | 156/39 |

*Primary Examiner*—Deborah Jones
*Assistant Examiner*—Abraham Bahta
*Attorney, Agent, or Firm*—Baker & Botts, LLP

[57] ABSTRACT

A structural article comprises a substrate having an ionic charge which is coated with a coating having essentially the same ionic charge. The coating consists essentially of a filler material and a binder material. The substrate is preferably fiberglass, the filler is selected from the group consisting of fly ash, charged calcium carbonate, ceramic microspheres and mixtures thereof and the binder material is preferably acrylic latex. The substrate is preferably bonded together using a mixture of urea formaldehyde and standard acrylic. In a preferred embodiment, the coating comprises nearly 85% of the structural article and a filler which is approximately 50% fly ash and 50% calcium carbonate comprises approximately 85% to 95% of the coating.

19 Claims, No Drawings

COATED STRUCTURAL ARTICLES

This is a continuation-in-part of application Ser. No. 08/885,760 filed Jun. 27, 1997 now abandoned.

BACKGROUND OF THE INVENTION

This invention relates to structural articles and a method for making such articles comprising a substrate having an ionic charge coated with a coating having essentially the same charge and consisting essentially of a filler material and a binder material.

For many years substrates such as fiberglass have been coated with various compositions to produce structural articles having utility in, among other applications, the building industry. U.S. Pat. No. 5,001,005 relates to structural laminates made with facing sheets. The laminates described in that patent include thermosetting plastic foam and have planar facing sheets comprising 60% to 90% by weight glass fibers (exclusive of glass micro-fibers), 10% to 40% by weight non-glass filler material and 1% to 30% by weight non-asphaltic binder material. The filler materials are indicated as being clay, mica, talc, limestone (calcium carbonate), gypsum (calcium sulfate), aluminum trihydrate (ATH), antimony oxide, cellulose fibers, plastic polymer fibers or a combination of any two or more of those substances. The patent further notes that the filler materials are bonded to the glass fibers using binders such as urea-, phenol- or melamine-formaldehyde resins (UF, PF, and MF resins), or a modified acrylic or polyester resin. Ordinary polymer latexes used according to the disclosure are Styrene-Butadiene-Rubber (SBR), Ethylene-Vinyl-Chloride (EVCl), PolyVinylidene Chloride (PvdC), modified PolyVinyl Chloride (PVC), PolyVinyl Alcohol (PVOH), and Poly-Vinyl Acetate (PVA).

U.S. Pat. No. 4,745,032 discloses an acrylic coating comprised of one acrylic underlying resin which includes fly ash and an overlying acrylic resin which differs from the underlying resin.

U.S. Pat. No. 4,229,329 discloses a fire retardant coating composition comprising fly ash and vinyl acrylic polymer emulsion. The fly ash is 24 to 50% of the composition.

Many different coating compositions have been formulated over the years but often such compositions would bleed through substrates, such as fiberglass substrates, if the substrates were coated on just one side, unless the compositions had a high binder content and/or included viscosity modifiers to enhance the viscosity of the coating composition. To prevent bleed through, such coating compositions sometimes had their viscosity increased by blowing or whipping air into the compositions. Although such blown compositions did not bleed through to the other side of mats such as fiberglass mats, the raw material costs for the compositions were high because of the numbers of constituent elements involved.

Accordingly, it is an object of this invention to provide a structural article having a coating which includes only two major constituents, while eliminating the need for viscosity modifiers, for stabilizers or for blowing. It is also an object of this invention to provide a low cost, relatively light weight structural article comprised principally of a coating having a low binder content and a high filler content. It is a further object of this invention to provide a relatively light weight, low cost coating which coats a substrate without bleeding through the substrate.

SUMMARY OF THE INVENTION

In accordance with the invention, a structural article is made by coating a substrate having an ionic charge with a coating having essentially the same ionic charge. The coating consists essentially of a filler material and a binder material. By coating the substrate with a coating having essentially the same ionic charge, the applicant has developed a zero bleed through product while using only two major ingredients in the coating and eliminating the need for costly and time consuming processing steps such as blowing. Applicant has discovered that by producing a coating having essentially the same ionic charge as the substrate, a zero bleed through product may be produced having a low binder content and no viscosity modifiers.

The coated substrate of the present invention may be any suitable reinforcement material capable of withstanding processing temperatures, such as glass fibers, polyester fibers, cellulosic fibers, asbestos, steel fibers, alumina fibers, ceramic fibers, nylon fibers, graphite fibers, wool fibers, boron fibers, carbon fibers, jute fibers, polyolefin fibers, polystyrene fibers, acrylic fibers, phenolformaldehyde resin fibers, aromatic and aliphatic polyamide fibers, polyacrylamide fibers, polyacrylimide fibers or mixtures thereof which may include bicomponent fibers.

The filler may be class F fly ash wherein 90% to 95% by weight of the fly ash is aluminosilicate. Such a fly ash, known as Alsil O4TR, is produced by JTM Industries of Kennesaw, Ga. Alternatively, the filler may be charged calcium carbonate or ceramic microspheres, or a blend of fly ash and calcium carbonate, or a blend of fly ash, calcium carbonate and ceramic microspheres or any combination of these filler materials to meet desired cost and weight criteria. Calcium carbonate and fly ash filler increase the weight of the product, but utilization of ceramic microspheres enables the manufacture of a product with reduced weight and increased fire resistant properties. Ceramic microspheres can withstand heat greater than 2000° F. Also, ceramic microspheres increase compressive strength, absorb no latex and/or water and thus permit the faster drying of the product. Ceramic microspheres also increase product flexibility.

Further, the ceramic microspheres help to increase the pot life of the coating. Heavier particles in the calcium carbonate and fly ash filler, although they may comprise but a small percentage of the particles in the filler, have a tendency to settle near the bottom of a storage vessel. When ceramic microspheres are mixed together with calcium carbonate and/or fly ash filler, a dispersion is produced which has an increased pot life or shelf life. Without wishing to be bound by any particular theory, it is believed that as the filler particles naturally fall in the vessel and the ceramic microspheres rise, the smaller size filler particles are supported by the ceramic microspheres, thus enabling the microspheres to stay in solution and preventing the filler particles, to at least some extent, from descending to the bottom of the vessel.

The table below provides, in percentages, some of the combinations of calcium carbonate, fly ash and ceramic microspheres which applicant has utilized as the filler component in the coating:

TABLE I

|  | A % | B % | C % | D % | E % | F % |
|---|---|---|---|---|---|---|
| 1. Water | 18.9 | 25.9 | 37.33 | 25.9 | 24.9 | 24.9 |
| 2. Acrylic Latex | 6.0 | 6.0 | 6.42 | 6.0 | 6.0 | 6.0 |
| 3. Fly Ash | 75.0 | 34.0 | — | 40.0 | — | 20.0 |
| 4. CaCO$_3$ | — | 34.0 | — | — | 40.0 | 20.0 |
| 5. Microspheres | — | — | 56.14 | 28.0 | 29.0 | 29.0 |
| 6. Defoamer | 0.1 | 0.1 | 0.1 | 0.1 | 0.1 | 0.1 |
|  | 100% | 100% | 100% | 100% | 100% | 100% |

The microspheres were a 50/50 ratio of 3M's W1012 microspheres and 3M's smaller diameter G200 microspheres. Although the table shows possible combinations of calcium carbonate, fly ash and ceramic microspheres in the filler component of the coating, it is believed that any combination of these materials may be employed.

The coating is prepared by using a binder material such as a high performance heat-reactive acrylic latex polymer to bond the filler materials together and to bond the filler to the substrate. Such a binder material is Hycar 2679 acrylic latex polymer supplied by B.F. Goodrich Company of Cleveland, Ohio. It is believed, however, that any linear polymer, linear copolymer or branched polymer may be useful in preparing the coating. Possible binder materials include butyl rubber latex, SBR latex, neoprene latex, polyvinyl alcohol emulsion, SBS latex, water based polyurethane emulsions and elastomers, vinyl chloride copolymers, nitrile rubbers and polyvinyl acetate copolymers.

In a preferred embodiment (Examples III, V and VIII below), the coating comprises nearly 85% by weight of the structural article. In that coating, approximately from 84% to 96% by weight is filler and the remainder is the acrylic latex binder. The filler is approximately 50% fly ash and 50% calcium carbonate. The substrate comprises about 15% by weight of the structural article. Glass fibers comprise approximately 12% by weight of the article and a binder material comprises about 3% by weight of the article. The binder which bonds together the glass fibers is from 99% to 75% (preferably 98% to 94%) by weight urea formaldehyde and from 1% to 25% (preferably 2% to 6%) by weight standard acrylic latex.

The substrate may be coated by air spraying, dip coating, knife coating, roll coating or film application such as lamination/heat pressing. The coating may be bonded to the substrate by chemical bonding, mechanical bonding and/or thermal bonding. Mechanical bonding is achieved by force feeding the coating onto the substrate with a knife.

Structural articles made in accordance with this invention may be of any shape and may be used in any of a variety of products including roofing shingles, structural laminate facing sheets, building air duct liners, roofing underlayment (or roofing felt), underlayment for organic shingles to provide Class "A" U.L. rating, built up roofing materials, roll roofing, modified roll products, filter media (including automotive filters), automotive hood liners, head liners, fire walls, vapor barriers etc. Preferably, such articles are planar in shape. The substrate is coated on one side or both sides depending on the intended application. For instance, if one side of the substrate is coated with the filler/binder coating, the other surface can be coated with conventional roofing asphalt, modified asphalts and non-asphaltic coatings, and the article can then be topped with roofing granules. It is believed that such roofing material could be lighter in weight, offer better fire resistance and better performance characteristics (such as cold weather flexibility, dimensional stability and strength) than prior art roofing materials.

Additionally, the structural article may be coated with a water repellent material. Two such water repellent materials are Aurapel 330R and Aurapel 391 available from the Auralux Corporation of Norwich, Conn. It is believed that wax emulsions, oil emulsions, silicone emulsions, polyolefin emulsions and surfonyls as well as other similar performing products may also be suitable water repellent materials. Further, structural articles made in accordance with the invention may be coated with an algaecide such as zinc powder, copper oxide powder or the herbicides Atrazine available from e.g. Ribelin Industries or Diuron available from e.g. Olin Corporation, an antifungal material such as Micro-Chek 11P, an antibacterial material such as Micro-Chek 11-S-160, a surface friction agent such as Byk-375, a flame retardant material such as ATH (aluminum trihydrate) available from e.g. Akzo Chemicals and antimony oxide available from e.g. Laurel Industries and/or a coloring dye such as T-1133A and iron oxide red pigments, and other products which can impart specific surface functions. The Micro-Chek products are available from the Ferro Corporation of Walton Hills, Ohio. Byk-375 may be obtained from Wacker Silicone Corporation of Adrian, Mich. and T-1133A is sold by Abco Enterprises Inc. of Allegan, Mich. The additional coatings of, e.g. water repellent material, antifungal material, antibacterial material, etc., may be applied to one or both sides of structural articles otherwise having filler/binder coatings on one or both sides of a substrate. For example, structural articles comprising substrates coated on one or both sides with filler/binder coatings could be coated on one side with a water repellent composition and on the other side with an antibacterial agent.

Applicant's invention also involves a method for making a structural article comprising the steps of coating a substrate having an ionic charge with a coating having essentially the same ionic charge. The coating consists essentially of a filler material and a binder material. In one embodiment, the coating is prepared by mixing the filler material and the binder material until the ionic charge of the mixed materials changes such as to increase the viscosity of the coating. In the preferred embodiment, the substrate is anionic and the coating is essentially anionic even though the cationic nature of the coating increases during the aforementioned mixing.

DETAILED DESCRIPTION

Structural articles are made by coating a substrate having an anionic charge with a coating having essentially the same ionic charge. Any suitable reinforcement material capable of withstanding processing temperatures may be employed as a substrate in accordance with the invention. Examples include, inter alia, glass, fiberglass, ceramics, graphite (carbon), PBI (polybenzimidazole), PTFE, polyaramides, such as KEVLAR and NOMEX, metals including metal wire or mesh, polyolefins such as TYVEK, polyesters such as DACRON or REEMAY, polyamides, polyimides, thermoplastics such as KYNAR and TEFZEL, polyether sulfones, polyether imide, polyether ketones, novoloid phenolic fibers such as KYNOL, cotton, asbestos and other natural as well as synthetic fibers. The substrate may comprise a yarn, filament, monofilament or other fibrous material either as such or assembled as a textile, or any woven, non-woven, knitted, matted, felted, etc. material. The polyolefin may be polyvinyl alcohol, polypropylene, polyethylene, polyvinyl chloride, polyurethane, etc. alone or in combination with one another. The acrylics may be DYNEL, ACRILAN and/or ORLON. RHOPLEX AC-22 and RHOPLEX AC-507 are acrylic resins sold by Rohm and Haas which may also be used. The cellulosic fibers may be natural cellulose such as wood pulp, newsprint, Kraft pulp and cotton and/or chemically processed cellulose such as rayon and/or lyocell.

The fly ash referred to in the examples was obtained from JTM Industries, Inc. of Martin Lake and Jewett, Tex. and had a particle size such that less than 0.03% remained on an agitated 0.1 inch×0.1 inch screen. The ceramic microspheres were manufactured by Zeelan Industries of 3M Center Bldg., 220-8E-04, St. Paul, Minn. 55144-1000. Calcium carbonate was obtained from Franklin Industrial Minerals of 612 Tenth Avenue North, Nashville, Tenn. 37203. Black colorant or pigment used in various of the articles of the examples was T-113A sold by Abco, Inc.

Foamed structural articles made in accordance with the present invention may be made by any of the known methods for making foamed compositions such as, for example, aeration by mechanical mixing and the other techniques described in U.S. Pat. No. 5,110,839.

EXAMPLE I

To reduce the weight and cost of coated structural articles, the applicant formulated the coating using three ingredients:

water, BF Goodrich acrylic latex Hycar 2679 and JTM Alsil O4TR fly ash filler. The amounts of the three constituents were as follows: 19% water, 6% Hycar 2679, 74% JTM fly ash. Dye and defoaming agent made up 1% of the formulation. Generally, the coating may be produced by combining 50% to 80% fly ash filler, 1% to 25% acrylic latex binder, 15% to 25% water and minor amounts of dye and defoaming agent as needed. The defoaming agent was Drew Plus Y-250 sold by Drews Industrial Division of Boonton, N.J. The materials were mixed in a reaction or mixing kettle for 45 minutes. JTM fly ash filler comprised a much higher percentage of the coating than the 40–45% by weight filler which is the industry standard. Moreover, the binder content was lower than amounts usually found in such coating formulations.

The coating was used to coat a fiberglass mat on one side. The mat was manufactured by Elk Corporation of Ennis, Tex. and had a basis weight in the range of 1.4 lb./sq. to 2.0 lb./sq. The mat had a porosity in the range of 800 to 1,000 cfm. Heretofore, when such highly porous mats have been coated on one side only, it was expected that the coating would bleed through to the other side. In accordance with the present invention however, the novel coating coated the surface of the fiberglass mat very well and did not bleed through to the other side of the mat. The coated article was durable and flexible and did not crack on bending. Typical tensile strength measurements were as follows: machine direction 156 lbs.; cross direction 57 lbs.; average 107 lbs. Typical tear strength measurements were as follows: machine direction 151 grams; cross direction 306 grams; average 229 grams.

The coated article was hand brushed with adhesive to determine if there was bleed through to the other side of the article. No bleed through was observed. Further, the coated article was soaked in unleaded gasoline for 48 hours and no change in the physical state of the article was observed. There was no degradation and no reaction. The coated article was also checked for combustibility. When exposed to flame it burned, but when the flame was removed the burning stopped.

Surprisingly, when the coating of the present invention was used to coat the fiberglass mat on one side, it did not bleed through to the other side even though the coating had a relatively low viscosity of 700 cp. Although not wishing to be bound by any particular theory, the applicant believes that the coating did not bleed through the mat because the fiberglass mat is anionic and the coating of the present invention (when wet) includes a combination of water and Hycar 2679 (which together are anionic) and JTM filler (which is also anionic). The addition of the JTM filler to the acrylic latex in water results in a repulsion of charges and low viscosity. Although low viscosity is not a desired objective for coating a highly porous mat, the unique characteristic of the invention is that the coating does not bleed through regardless of the viscosity because the mat is also anionic and like charges repel each other just as the north pole of one magnet repels the north pole of another magnetic.

If desired, however, the viscosity of the coating can be increased through mixing. It is believed that JTM Alsil-O4TR fly ash filler is approximately 90% to 95% aluminosilicate, which is unaffected by water, but in acidic solution undergoes hydrolysis. The water and latex solution to which JTM fly ash filler was added is acidic in nature and, on prolonged mixing, there is some hydrolyzation of the aluminosilicate thereby increasing the viscosity of the coating. The longer or the more rapidly the coating is mixed, the higher the viscosity. However, the coating still maintains an essentially anionic charge and thus there is still repelling of charges between the coating and the substrate.

Whether slowly or rapidly mixed, the coatings of the present invention may be applied to the substrates in relatively uniform thin coats because the like charges among the filler and acrylic latex elements in the coating repel one another. Thus, it is believed that the ionic charge repulsion characteristic which prevents the coating from bleeding through the mat also enables the application on the mat of a relatively uniform thin film coating. In instances where, due to price, supply or other considerations, the filler material to be employed has an ionic charge which is essentially the opposite of the charge of the substrate, modifiers are available to coat the filler material so that ultimately the coating and substrate of the article have essentially the same ionic charge. It is believed that viscosity modifiers could serve such a purpose.

EXAMPLE II

Water, Hycar 2679 acrylic latex and JTM Alsil-O4TR fly ash were combined in the same amounts as noted in Example I. However, in accordance with another embodiment of the invention, the materials were mixed for a longer period, 7 hours, in the same reaction/mixing vessel with a paddle mixer. The coating had a viscosity of about 40,000 cp. The coating was then applied to the same type of mat using the same technique as recited in Example I. The tensile and tear strengths of the coated article were the same as in Example I. The viscosity of the materials increased during mixing in both Examples I and II. However, relatively rapid mixing such as in Example I results in the production of foam which was observed in only small amounts in Example II which was mixed more slowly. Accordingly, a defoaming agent is added when the materials are mixed rapidly.

The invention provides a coated fabric which is rigid in nature and is also flexible enough to be rolled up, showing no signs of cracking, etc. The coated fabric has a porosity of less than 1.0 cfm and adheres very well to polyurethane foam, isocyanurate foam, asphaltic compounds, and granules (non-asphaltic shingle components).

The coated product may have few pinholes or may have numerous pinholes and still maintain a porosity of less than 1.0 cfm when coated with solvent based adhesive such as Firestone Bonding Adhesive BA-2004, i.e. the adhesive did not bleed to other side.

The coated articles were made water repellent by coating with further additives, Aurapel 330R and Aurapel 391, which can be obtained from Auralux Corporation. The coating was accomplished by diluting the coating compound with water and then kiss coating the articles on one side while they were being coated on the other side by standard coating techniques which included the use of a doctor blade.

Prior to coating with a water repellent coating, the novel coating of the present invention can be treated with pigment or dye or any other suitable coloring means to give color to the structural articles of the invention. For instance, a carbon black pigment (0.5% by weight) was added to the coating composition of the Examples to give color texture to the finished coating on the fiberglass mat.

Besides water repellent treatment, the structural articles of the present invention can be coated with antifungal, antibacterial and surface friction agents, an algaecide and/or a flame retardant material by mixing with the coating constituents prior to coating the substrate or by spraying on the partly finished articles at some point in the processing, e.g. between drying and curing.

Coating of the fiberglass substrates was accomplished by the applicant using a hand-held coater which can be obtained from the Gardner Company, but any conventional method, such as spraying, dipping and flow coating from aqueous or solvent dispersion, calendering, laminating and the like, followed by drying and baking, may be employed to coat the substrate as is well known in the art. Best coating results were observed using a Gardner profile 10 blade. After coating, the samples were placed in an oven at approximately 400° for about 2.0 minutes to achieve drying and curing. Additionally, the coating may be separately formed as a film of one or more layers for subsequent combination with the substrate.

Hycar 2679 acrylic latex polymer has a low Brookfield viscosity of 100 cP. The low viscosity makes the polymer easily miscible with water and filler. This heat reactive acrylic polymer is compatible with all fillers due to its anionic charge. Products made with coatings which include the polymer are flexible at extreme high and low temperatures because the polymer has a glass transition temperature (Tg) of −3° C.

Hycar 2679 polymer emulsion contains a colloidal dispersion of polymer and copolymers in water, emulsifiers, such as synthetic soap (sometimes known as surface active agents or surfactants) and other ingredients such as buffers and protective colloids. These ingredients enable the polymer to be compatible with a wide variety of fillers. Without being bound to any particular theory, it is believed that Hycar 2679, with its thixotropic characteristics, enhances the viscosity of most fillers.

In order to increase the pot life and lower the viscosity of the coating compositions of Examples I and II and to decrease the basis weight and increase the coefficient of friction of the finished coated product, calcium carbonate was incorporated into the formulation in a ratio of 50:50 and 25:75 to JTM fly ash filler. Calcium carbonate is produced by crushing limestone. During this crushing process, trace amounts of iron and aluminum which come off of the grinding apparatus provide an ionic charge to the calcium carbonate, permitting it to substitute for some or all of the fly ash in the coating. The calcium carbonate can be 100% of the filler component if an appropriate ionic charge is present or if an appropriate ionic material is added (either instance being referenced herein as "charged calcium carbonate"). Suitable ionic materials include Alcosperse 149 which may be obtained from Alco Chemical Division of National Starch and Chemicals of Chattanooga, Tenn., Aerosol 18 which may be obtained from American Cyanamid in West Patterson, N.J., ammonium stearate and ammonium hydroxide, both of which may be obtained from Henkel of Ambler, Pa. Calcium carbonate is more stable in water when compared to JTM fly ash and does not undergo hydrolysis in acidic media created by the Hycar acrylic latex and the water. Calcium carbonate has a larger particle size than JTM fly ash. The mixture of small and large size particles makes the surface of the coated product rough and increases the coefficient of friction.

EXAMPLE III

When the filler component in the coating was 50% JTM fly ash and 50% calcium carbonate, the coating was very fluid (viscosity=272 cp. to 388 cp) and had a pot life of 6 to 8 hours. The coated product had a porosity of 3.5 cfm.

EXAMPLE IV

A coating formulation was prepared wherein the filler component comprised 25% calcium carbonate and 75% JTM fly ash. First, 221.59 lbs. of calcium carbonate were added to 342.81 lbs. of water forming a solution. The Hycar latex was added and 4 inches to 6 inches of foam were generated. 664.76 lbs. of fly ash were then added and most of the foam was eliminated. 1.3 lbs. of defoamer were then added and the remaining foam was eliminated. The coating was mixed for about 15 minutes until a thixotropic effect was observed. The coating was very fluid (viscosity=2,000 cp) and compound density was about 13 lbs./gallon. The fiberglass mat described in Examples I and II was coated using a blade and no bleed through was observed.

EXAMPLE V

The fiberglass mat described in Examples I and II was coated on one side with a coating according to Example I except that 50% of the JTM fly ash was replaced with calcium carbonate. Two rolls of fiberglass mat were coated on one side and, due to the ionic nature of the coating, no bleed through of the coating was noticed on the other side of the mat. The low viscosity coating composition coated the fiberglass mat fabric as well as the higher viscosity composition. Utilization of a low viscosity coating enabled a reduction in basis weight of the final product from 10.5 lbs./sq. to 8.5 lbs./sq.

EXAMPLE VI

The fiberglass mat of Examples I and II was coated on both sides using the coating formulation of Example IV. The top of the fabric was coated using a straight edge blade while the bottom of the fabric was kiss coated using a large steel roller which picked up the coating from a tank and coated the bottom of the fabric. The coating in the tank had been diluted by increasing the water composition 10% to lower the viscosity to facilitate kiss coating.

EXAMPLE VII

Ceramic microspheres were incorporated in the filler component of the coating together with JTM fly ash and calcium carbonate to produce one sided and two sided coated products as indicated in Table I above. Microspheres offer a variety of inherent advantages over filler materials having irregularly shaped particles such as JTM fly ash and calcium carbonate. Advantages include improved flow, low viscosity even when the coating has a high filler content, hardness and abrasion resistance and low dielectric constant. Utilization of ceramic microspheres enhances one of the most important physical properties of the finished coated product—thermal insulation. Accordingly, use of ceramic microspheres in the coating of the product will enable facer manufacturers to use less foam while achieving the same Class A fire rating. Ceramic microspheres also bond ionically to water and the Hycar 2679 acrylic latex and require no additive to build up viscosity.

EXAMPLE VIII

It is believed that a preferred embodiment is prepared by combining constituents in the following amounts: 29% water, 6% Hycar 2679 acrylic latex, 31.25% JTM fly ash, 31.25% calcium carbonate, 0.5% Aurapel 330R and 2.0% SBR rubber which was obtained from Ultra Pave, a distributor of Goodyear Tire and Rubber Co. of Cleveland, Ohio. Alternative suitable SBR rubbers include UP1156, UP70 and UP72, all of which may be obtained from Ultra Pave. A cross linking agent, such as B720 obtained from Texpar of Waukesha, Wis. may be added to cross link the acrylic latex and the SBR rubber. Zinc oxide may also be employed as a cross linking agent.

The inventive coatings described in the foregoing examples did not bleed through to the other side of the fiberglass mats even when the viscosity of the coating composition was very low and the fiberglass mat utilized was highly porous. JTM fly ash contains aluminum, silicon, calcium, magnesium and silicon dioxide. All of these ingredients are cationic in nature and show a great affinity toward the anionic charge of the Hycar acrylic latex polymer. This affinity of opposite charges results in high viscosity of the coating compound. Fly ash is inert in water, but it hydrolyzes in acidic media. Hycar 2679 latex is acidic in nature, having a pH of 3.7. This latex hydrolyzes the JTM fly ash and this hydrolysis results in ever increasing viscosity of the composition over time. JTM fly ash also absorbs water over time and this water absorption further increases the composition's viscosity. After about 3 hours, the viscosity of the composition has been raised to such an extent that the addition of water is required to properly adjust it.

To increase the pot life of the coating composition, JTM fly ash was replaced in part with calcium carbonate filler. The calcium carbonate not only reduced the composition's viscosity, it also lowered the basis weight of the finished coated product. Further, while calcium carbonate has some affinity toward the Hycar acrylic latex, it has much less affinity than JTM fly ash. The aluminum and iron impurities in calcium carbonate, which result from the crushing of limestone by metal rods, are cationic in nature and cause the affinity of the calcium carbonate for the Hycar latex. However, the metal impurities in the calcium carbonate weigh far less than JTM filler particles. Utilization of calcium carbonate filler blends as 100% of the filler component or some portion thereof in conjunction with JTM fly ash prolongs the pot life of the coating composition. JTM fly ash particles are more uniform and smaller in size when compared to calcium carbonate filler particles. Accordingly, products having a coating composition which includes only JTM fly ash as filler, have a smoother surface than products which are coated with a composition which includes calcium carbonate. Moreover, products including calcium carbonate ate as a filler component in the coating have a reduced final basis weight because fewer of the larger calcium carbonate particles are required to block the porous fiberglass mat.

Utilization of ceramic microspheres as a filler component in the coating also enhances the pot life of the coating compound. Ceramic microspheres do not absorb water, but bond with water and the Hycar acrylic latex with weak hydrogen bonding and this bonding phenomena results in a thixotropic effect which results in the desired viscosity for long pot life, composition stability, improved flow and ease of mixing.

It should be understood that the above examples are illustrative, and that compositions other than those described above can be used while utilizing the principals underlying the present invention. For example, other sources of filler as well as mixtures of acrylic latex and/or surfactants can be used in formulating the structural articles. Moreover, the coating compositions can be applied to various types of substrates, as described above.

What is claimed is:

1. A structural article comprising a substrate having an ionic charge coated with a coating having essentially the same ionic charge wherein said coating consists essentially of a filler material and a binder material and wherein said binder material bonds the filler material together and to the substrate and wherein said coatings does not bleed through said substrate.

2. A structural article according to claim 1 wherein said substrate is fiberglass, said filler is selected from the group consisting of fly ash, calcium carbonate, ceramic microspheres and mixtures thereof and said binder is acrylic latex.

3. A structural article according to claim 2 wherein said substrate is planar and is coated on one side with said coating.

4. A structural article according to claim 2 wherein said substrate is planar and is coated on both sides with said coating.

5. A structural article according to claims 1, 3 or 4 wherein said article further includes on one or both sides a water repellent material.

6. A structural article according to claims 1, 3 or 4 wherein said article further includes on one or both sides an antifungal material.

7. A structural article according to claims 1, 3 or 4 wherein said article further includes on one or both sides an antibacterial material.

8. A structural article according to claims 1, 3 or 4 wherein said article further includes on one or both sides a surface friction agent.

9. A structural article according to claims 1, 3 or 4 wherein said article further includes on one or both sides a flame retardant material.

10. A structural article according to claims 1, 3 or 4 wherein said article further includes on one or both sides an algaecide.

11. A structural article according to claims 1, 3 or 4 wherein said article is colored with dye on one or both sides.

12. A structural article according to claims 2, 3 or 4 wherein said substrate is bonded together by a binder material consisting essentially of urea formaldehyde and acrylic latex.

13. A structural article coated with a coating consisting essentially of a filler material and a binder material wherein
a) said article is from 10% to 25% by weight glass fibers and
b) said coating is from 84% to 96% filler selected from the group consisting of fly ash, charged calcium carbonate, ceramic microspheres and mixtures thereof and from 16% to 4% acrylic latex binder material.

14. A structural article according to claim 13 wherein said coating further includes SBR rubber.

15. A structural article according to claim 14 wherein said acrylic latex binder and said rubber are cross linked.

16. A structural article according to claim 15 wherein said glass fibers are bonded together by a mixture of from 99% to 75% urea formaldehyde and from 1% to 25% acrylic latex.

17. A method for making a structural article comprising the steps of coating a substrate having an ionic charge with a coating having essentially the same ionic charge wherein said coating consists essentially of a filler material and a binder material and wherein said binder material bonds the filler material together and to the substrate.

18. A method according to claim 16 wherein
a) said coating is prepared by mixing the filler material and the binder material until the viscosity of the coating increases; and
b) the substrate is then coated with the more viscous coating.

19. A structural article according to claim 14 wherein said article is roofing underlayment and wherein said filler is charged calcium carbonate.

* * * * *

UNITED STATES PATENT AND TRADEMARK OFFICE
CERTIFICATE OF CORRECTION

PATENT NO.    : 5,965,257
DATED         : October 12, 1999
INVENTOR(S)   : Younger Ahluwalia Page 1 of 1

It is certified that error appears in the above-identified patent and that said Letters Patent is hereby corrected as shown below:

[56] References Cited: Insert -- FOREIGN PATENT DOCUMENTS WO 82/00269A 2/1982.....WIPO --

[56] References Cited: Insert -- OTHER PUBLICATIONS DATABASE WPI Section Ch, Week 8923, Derwent Publication Ltd., London, GB; Class A93, AN90-171160 XP002079625 & RO 96 083 A (Trust Antr Gen Cons), November 10, 1988 --

Column 9,
Line 30, "ate" should be deleted
Line 55, "coatings" should read -- coating --

Signed and Sealed this

Eighteenth Day of September, 2001

Attest:

NICHOLAS P. GODICI
*Attesting Officer*   *Acting Director of the United States Patent and Trademark Office*